(12) United States Patent
Kim (10) Patent No.: US 8,486,231 B2
(45) Date of Patent: Jul. 16, 2013

(54) PRYOLYTIC ENERGY RECOVERY SYSTEM

(76) Inventor: Young Ho Kim, Chungcheongbuk-do (KR)

( * ) Notice: Subject to any disclaimer, the term of this patent is extended or adjusted under 35 U.S.C. 154(b) by 759 days.

(21) Appl. No.: 12/597,131

(22) PCT Filed: Dec. 19, 2008

(86) PCT No.: PCT/KR2008/007559
§ 371 (c)(1),
(2), (4) Date: Oct. 22, 2009

(87) PCT Pub. No.: WO2010/071250
PCT Pub. Date: Jun. 24, 2010

(65) Prior Publication Data
US 2011/0240456 A1    Oct. 6, 2011

(30) Foreign Application Priority Data
Dec. 18, 2008 (KR) .................. 10-2008-0129442

(51) Int. Cl.
*C10B 7/00* (2006.01)
(52) U.S. Cl.
USPC ........... 202/117; 202/118; 202/222; 202/226; 202/230; 202/254; 202/260
(58) Field of Classification Search
USPC ................ 202/103, 114, 117, 118, 111, 254, 202/260, 222, 226, 230; 110/253, 257
See application file for complete search history.

(56) References Cited

U.S. PATENT DOCUMENTS

| | | | |
|---|---|---|---|
| 5,669,317 A * | 9/1997 | May et al. ............... | 110/229 |
| 7,037,410 B2 * | 5/2006 | Flanigan ................ | 202/81 |
| 7,789,999 B2 * | 9/2010 | Lee ........................ | 201/14 |
| 8,168,043 B2 * | 5/2012 | Titmas .................... | 201/21 |

FOREIGN PATENT DOCUMENTS

| | | | |
|---|---|---|---|
| KR | 1020070047270 | | 5/2007 |
| KR | 1020070053193 | | 5/2007 |
| KR | 2007047270 | * | 3/2008 |
| KR | 1020090102161 | | 9/2009 |
| KR | 1020090102162 | | 9/2009 |
| KR | 1020090102163 | | 9/2009 |

OTHER PUBLICATIONS

Korean Patent Abstract—Machine Translation of KR 20070047270, abstract and Figure only.*

* cited by examiner

*Primary Examiner* — Nina Bhat
(74) *Attorney, Agent, or Firm* — F. Chau & Associates, LLC (57) ABSTRACT

Provided is a pyrolytic energy recovery system for pyrolyzing wastes to obtain oil, the system including: a recovery furnace; a heat plate for dividing an inner space of the recovery furnace; a heating chamber disposed under the heat plate; a pyrolysis chamber disposed over the heat plate; a heating pipe line installed inside the front and rear surfaces of the recovery furnace; a rotary means constituted by a plurality of rotaries installed in the pyrolysis chamber to evenly distribute recyclable materials introduced through the recyclable material inlet port; a residual discharge means having primary residual conveyance screws longitudinally installed along the valley of the heat plate, a residual hopper installed at a separate space in the heating chamber such that the residual conveyed to a center part of the heat plate through the primary conveyance screws is lowered to be gathered, and a secondary residual conveyance screw installed from the residual hopper to the exterior of the recovery furnace and discharging the residual accumulated in the residual hopper to the exterior of the recovery furnace; and a condensing means separately installed at the exterior of the recovery furnace and receiving vaporized extracts generated through pyrolysis of the recyclable material in the pyrolysis chamber to exchange heat with the extracts to extract liquefied recovery oil.

5 Claims, 5 Drawing Sheets

PRYOLYTIC ENERGY RECOVERY SYSTEM

TECHNICAL FIELD

The present invention relates to a pyrolytic energy recovery system, and more particularly, to a pyrolytic energy recovery system capable of pyrolyzing various wastes in a high temperature pyrolysis chamber to evenly transfer heat into the pyrolysis chamber during a process of extracting useful oil, preventing heat loss during a process of discharging residuals after pyrolysis, and reducing discharge of imperfect pyrolysis residuals.

BACKGROUND ART

As industrial technology has developed, many kinds of industrial goods have been manufactured from fossil fuel, and due to increases in energy consumption, the date of exhaustion of the fossil fuel is growing ever more imminent. Moreover, due to large amounts of waste generated during a process of disposing industrial goods formed of synthetic resin, etc., environmental pollution continues to become a more serious problem. Therefore, nowadays, most countries in the world promote energy saving activities and regulate waste collection of recyclable wastes.

The applicant has filed several applications to the Korean Intellectual Property Office as results of development of apparatus for extracting useful pyrolysis oil during a pyrolysis process of wastes in a high temperature pyrolysis chamber to thereby save energy and recycle wastes, in consideration of the above circumstances. Techniques related to pyrolytic energy recovery systems developed by the applicant are disclosed in Korean Patent Laid-open Publication No. 10-2007-0047270, entitled "Catalyst-free Waste Plastics Pyrolysis Oil Recovery System," now issued as Korean Patent No. 10-0809733, and Korean Patent Laid-open Publication No. 10-2007-0053193, entitled "Catalyst-free Waste Plastics Pyrolysis Oil Recovery System," now issued as Korean Patent No. 10-0848680.

According to the conventional pyrolytic energy recovery systems, recyclable materials such as wastes inserted into a pyrolysis chamber are pyrolyzed during a process of indirectly transferring a large amount of heat from a burner to the recyclable materials, vaporized extracts generated during the pyrolysis process are condensed during a cooling process, and residuals after the pyrolysis are discharged through a screw-type residual discharge means installed under the pyrolysis chamber.

Meanwhile, in addition to the above pyrolytic energy recovery system, the applicant has developed and filed more developed pyrolytic energy recovery systems to the Korean Intellectual Property Office, for example, Korean Patent Application Nos. 10-2008-27437, now issued as Korean Patent No. 10-0956656, 10-2008-27438, now issued as Korean Patent No. 10-0956657, and 10-2008-27439, now issued as Korean Patent No. 10-0956658, etc.

As will be appreciated from the published and filed applications, the applicant is making efforts to develop and improve a pyrolytic energy recovery system and peripheral devices capable of indirectly exposing a pyrolysis chamber to a large amount of heat to perform pyrolysis of wastes, in a state in which the recyclable materials such as wastes are inserted into the pyrolysis chamber, in order to effectively obtain useful oil from the waste.

DISCLOSURE

Technical Problem

In order to solve the foregoing and/or other problems, it is an object of the present invention to provide a pyrolytic energy recovery system capable of more effectively transferring heat from a burner to a circumference of a high temperature pyrolysis chamber, into which recyclable materials such as wastes are inserted, during a process of extracting useful oil through pyrolysis of the wastes in the pyrolysis chamber.

It is another object of the present invention to provide a pyrolytic energy recovery system capable of recirculating heat from a burner flowing along a wall surface of a pyrolysis chamber, into which recyclable materials such as wastes are inserted, at a predetermined pressure or less, to reduce loss of energy consumed in operating the burner.

It is still another object of the present invention to provide a pyrolytic energy recovery system capable of reducing heat loss when recyclable materials such as wastes are pyrolyzed and imperfectly pyrolyzed residuals are discharged to the exterior and reducing the phenomenon of the imperfectly pyrolyzed recyclable materials or residuals being discharged to the exterior, during a process of extracting useful oil through pyrolysis of the wastes in the pyrolysis chamber.

Technical Solution

One aspect of the present invention provides a pyrolytic energy recovery system for pyrolyzing wastes to obtain oil, the system including: a recovery furnace having multi-walls of a front, a rear, sides, a ceiling and a floor, including insulating layers; a heat plate for dividing an inner space of the recovery furnace into upper and lower parts and having a height lowered from a center part to both sides thereof and formed with at least one ridge and valley in a longitudinal direction thereof; a heating chamber disposed under the heat plate and heated by a burner installed aside the recovery furnace; a pyrolysis chamber disposed over the heat plate and pyrolyzing the wastes introduced through a recyclable material inlet port installed at an upper part of a front or rear surface of the recovery furnace using a large amount of heat transferred from therearound; a heating pipe line installed inside the front and rear surfaces of the recovery furnace in a maze shape such that the heat induced from the heating chamber flows from a lower side to an upper side along inner surfaces of front and rear walls of the recovery furnace in a zigzag manner, and then, returns into the heating chamber at a pressure lower than a predetermined pressure and is discharged to the exterior at a pressure higher than the predetermined pressure; a rotary means constituted by a plurality of rotaries installed in the pyrolysis chamber under the recyclable material inlet port in a longitudinal direction to evenly distribute recyclable materials introduced through the recyclable material inlet port; a residual discharge means having primary residual conveyance screws longitudinally installed along the valley of the heat plate and rotated to convey the residual toward the center part from both sides, a residual hopper installed at a separate space in the heating chamber such that the residual conveyed to a center part of the heat plate through the primary conveyance screws is lowered to be gathered, and a secondary residual conveyance screw installed from the residual hopper to the exterior of the recovery furnace and discharging the residual accumulated in the residual hopper to the exterior of the recovery furnace; and a condensing means separately installed at the exterior of the recovery furnace and receiving vaporized extracts generated through pyrolysis of the recyclable material in the pyrolysis chamber to exchange heat with the extracts to extract liquefied recovery oil.

In addition, in the pyrolytic energy recovery system in accordance with the present invention, the wall of the recovery furnace may include an insulating layer built of firebricks or yellow earth, an inner layer surrounding the interior of the insulating layer to a predetermined thickness, and an outer layer surrounding the exterior of the insulating layer to a predetermined thickness, wherein the inner and outer layers are formed of forged steel (SB42) for pressure vessels.

Further, in the pyrolytic energy recovery system, the heating pipe line installed at front and rear surfaces of the recovery furnace may include a blower connected to the heating chamber through a heat induction pipe installed at both outer surfaces of the recovery furnace at its ends and installed at an end of the heating pipe line such that the heat introduced through the heat induction pipe strongly flows toward the heating pipe line, wherein the heating pipe line has an upward section having a zigzag shape such that the introduced heat flows from a lower side to an upper side in an alternating direction and a vertical section formed from an end of the upward section to the heating chamber in a vertical direction to be in communication with the upward section, an exhaust port is installed at a boundary between the upward section and a downward section to discharge the heat to be directed to the upper exterior of the recovery furnace, and a pressure regulator is installed on the exhaust port to be opened and closed by a certain pressure.

Furthermore, in the pyrolytic energy recovery system, the rotaries of the rotary means may be installed under the recyclable material inlet ports installed at both sides of the recovery furnace to form a multi-story structure in a vertical direction at predetermined intervals, and each story may have a plurality of rotaries, wherein the number of rotaries disposed in the intermediate story is larger than that of the rotaries disposed in the upper story by one such that the rotaries of the upper story are disposed between the rotaries of the intermediate story.

Meanwhile, in the pyrolytic energy recovery system, the condensing means may include a pair of condensers installed at both sides of the recovery furnace, wherein a multi-story of heat exchangers, through which cooling water passes from a lower side to an upper side thereof, are installed around the condenser, through which gaseous extracts pass.

In addition, in the pyrolytic energy recovery system, the residual hopper may be installed to divide the heating chamber into two side portions.

Further, in the pyrolytic energy recovery system, the primary residual conveyance screw may further include a rotary installed on an intermediate portion thereof to cross between the front and rear walls of the recovery furnace, wherein the rotary includes a blade having a diameter such that ends of the blade are close to the surface of the valley of the heat plate and stirring the residual accumulated on the valley of the heat plate to smoothly discharge the residual through the primary residual conveyance screw.

Advantageous Effects

According to a pyrolytic energy recovery system in accordance with an exemplary embodiment of the present invention, since heat from a burner can be more effectively transferred to a circumference of a high temperature pyrolysis chamber, into which various recyclable materials such as wastes are introduced, it is possible to remarkably increase pyrolysis efficiency of the recyclable materials in the pyrolysis chamber.

In addition, as the heat from the burner flowing along the wall surface of the high temperature pyrolysis chamber, into which various recyclable materials such as wastes are introduced, are returned into the heating chamber when a pressure in the pyrolysis chamber is lower than a predetermined pressure, it is possible to reduce loss of energy consumed for operation of the burner.

Further, during a process of extracting useful recovery oil through pyrolysis of various wastes in the high temperature pyrolysis chamber, it is possible to reduce heat loss when residuals are discharged to the exterior after the pyrolysis of the wastes, and reduce the phenomenon of the imperfectly pyrolyzed recyclable materials or residuals being discharged to the exterior.

DESCRIPTION OF DRAWINGS

The above and other objects, features and advantages of the present invention will be more apparent from the following detailed description taken in conjunction with the accompanying drawings, in which.

| Description of Major Reference Numerals | |
|---|---|
| 100: | Pyrolysis energy recovery system |
| 200: | Recovery furnace |
| 210: | Heat plate |
| 220: | Heating chamber |
| 222: | Heat induction pipe |
| 224: | Blower |
| 230: | Pyrolysis chamber |
| 240: | Burner |
| 250: | Recyclable material inlet port |
| 260: | Vapor discharge pipe |
| 300: | Heating pipe line |
| 400: | Rotary means |
| 410: | Rotary |
| 430: | Residual rotary |
| 500: | Residual discharge means |
| 510: | Primary residual conveyance screw |
| 520: | Residual hopper |
| 530: | Secondary residual conveyance screw |
| 540: | Residual storage chamber |
| 600: | Condensing means |
| 610: | Condenser |
| 620: | Heat exchanger |

MODES FOR INVENTION

Hereinafter, a pyrolytic energy recovery system in accordance with exemplary embodiments of the present invention will be described in detail with reference to the accompanying drawings.

Figure 1:
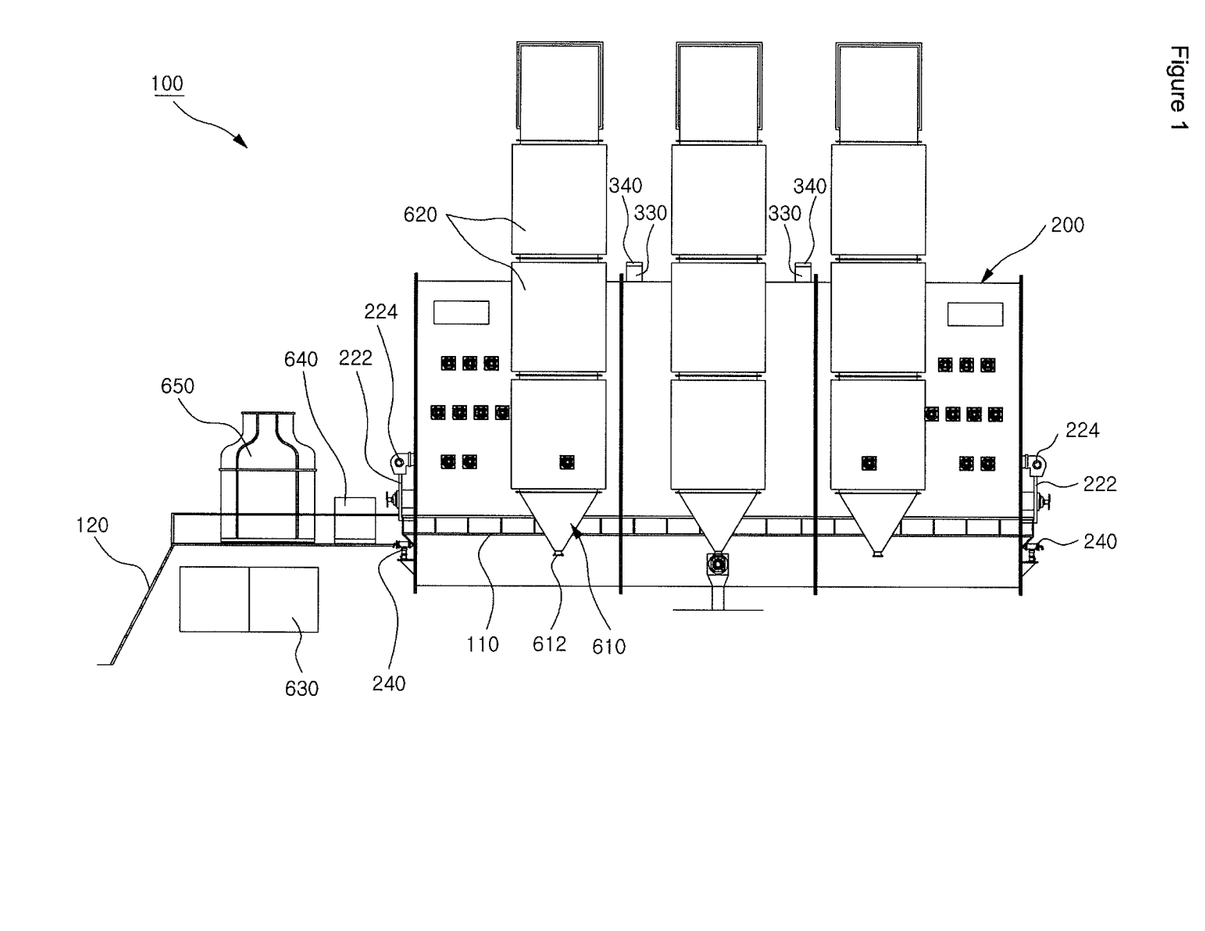
FIG. 1 is front view of a pyrolytic energy recovery system in accordance with an exemplary embodiment of the present invention.
Figure 2:
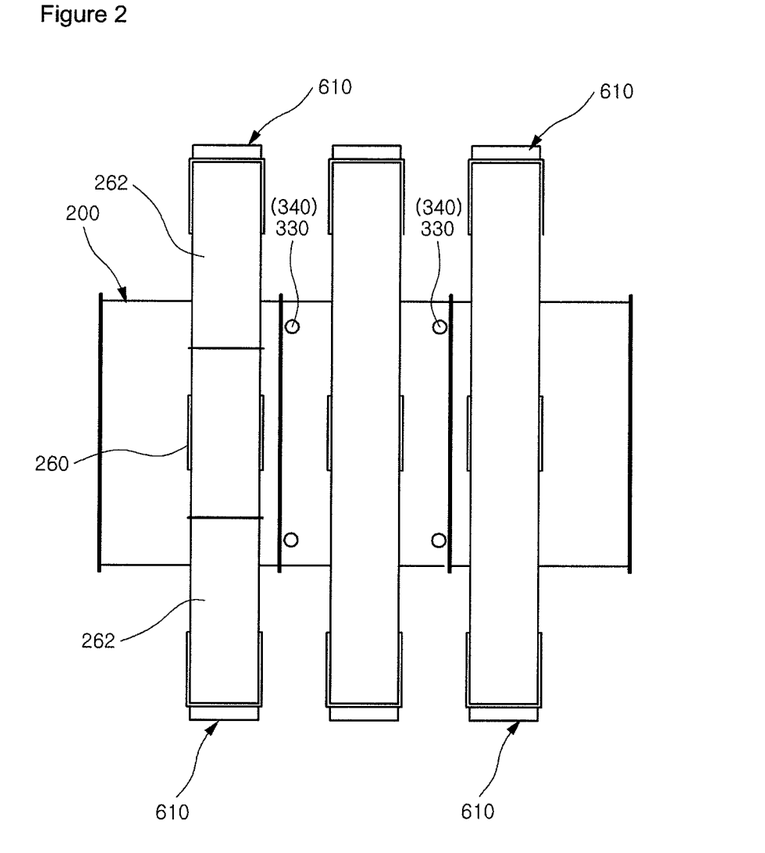
FIG. 2 is a plan view of the pyrolytic energy recovery system in accordance with an exemplary embodiment of the present invention.
Figure 3:
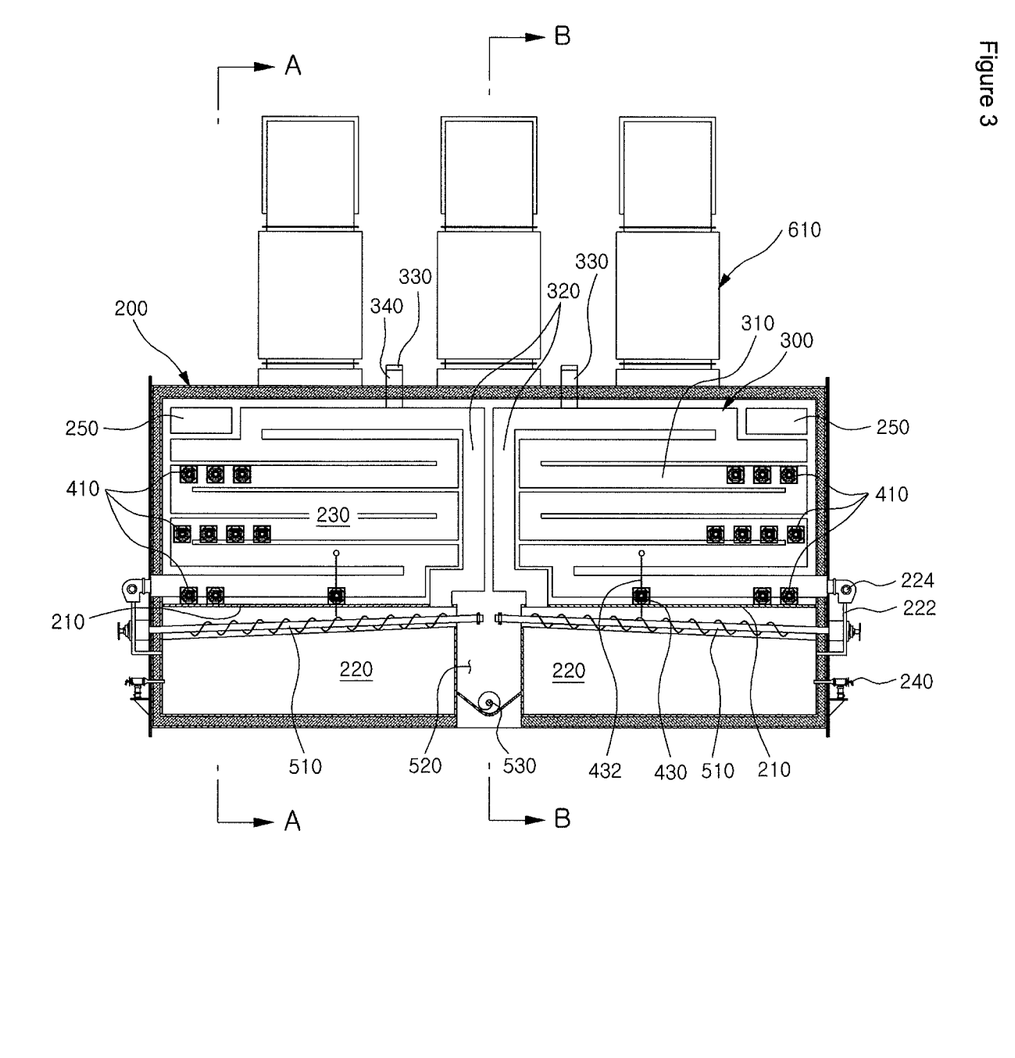
FIG. 3 is a cross-sectional view of the pyrolytic energy recovery system in accordance with an exemplary embodiment of the present invention.
Figure 4:
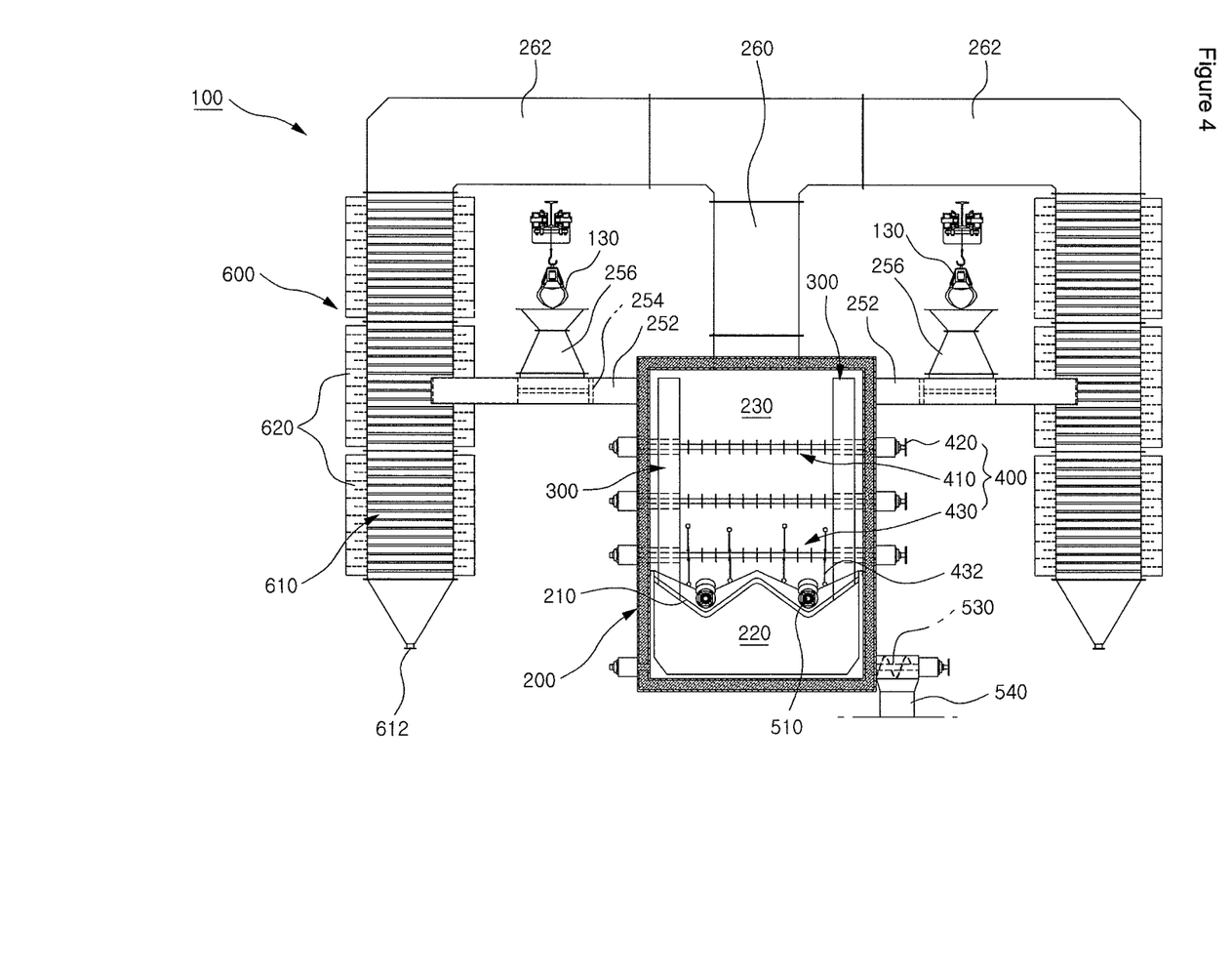
FIG. 4 is a cross-sectional view taken along the line A-A of FIG. 3.
Figure 5:
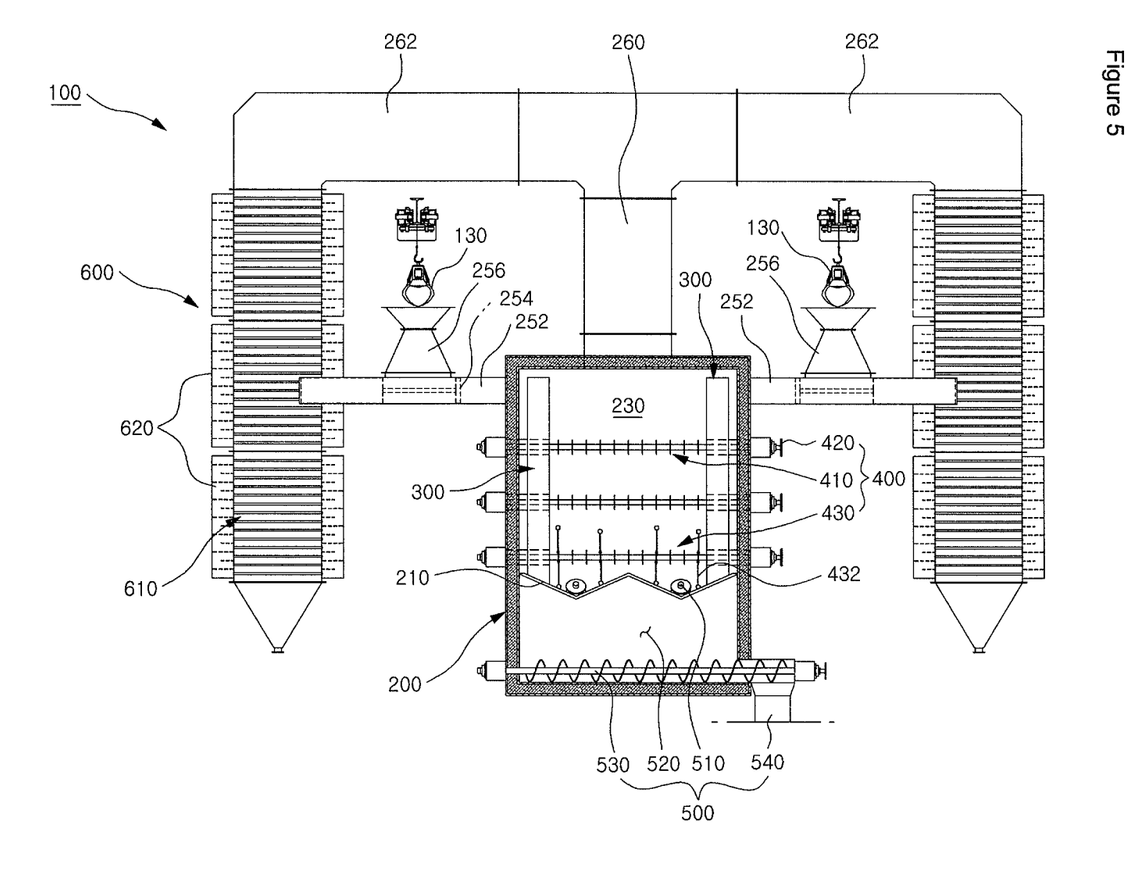
FIG. 5 is a cross-sectional view taken along the line B-B of FIG. 3.

FIG. 1 is front view of a pyrolytic energy recovery system in accordance with an exemplary embodiment of the present invention, FIG. 2 is a plan view of the pyrolytic energy recovery system in accordance with an exemplary embodiment of the present invention, FIG. 3 is a cross-sectional view of the pyrolytic energy recovery system in accordance with an exemplary embodiment of the present invention, FIG. 4 is a cross-sectional view taken along the line A-A of FIG. 3, and FIG. 5 is a cross-sectional view taken along the line B-B of FIG. 3.

Reference numeral 100 generally designates a pyrolytic energy recovery system in accordance with an exemplary embodiment of the present invention, and reference numeral 200 generally designates a recovery furnace of the pyrolytic energy recovery system in accordance with an exemplary embodiment of the present invention.

The pyrolytic energy recovery system in accordance with an exemplary embodiment of the present invention, as shown, includes a plurality of components organically installed at the interior and exterior of the recovery furnace 200. That is, the pyrolytic energy recovery system 100 basically includes the recovery furnace 200 having an inner space divided into a heating chamber 220 and a pyrolysis chamber 230 by a heat plate 210 installed therein, a heating pipe line 300 installed adjacent to front and rear wall surfaces of the recovery furnace to supply heat in the heating chamber 220 to a circumference of the pyrolysis chamber 230, a rotary means 400 installed in the pyrolysis chamber 230 to crush and distribute recyclable materials introduced into the pyrolysis chamber 230, a residual discharge means 500 installed under the pyrolysis chamber 230 and at a lower part of the heating chamber to discharge residuals after the pyrolysis in the pyrolysis chamber 230, and a condensing means 600 for heat-exchanging vaporized extracts generated through pyrolysis by a large amount of heat in the pyrolysis chamber 230 and extracting recovery oil in a liquid phase.

As shown in FIG. 1, peripheral devices such as a water tank 630, a water cooler 640, a cooling tower 650, etc., which are provided for cooling and supplying cooling water used in the heat exchanger 620, as a component of the condensing means 600, may be installed around the recovery furnace 200 of the pyrolytic energy recovery system 100 in accordance with an exemplary embodiment of the present invention. Meanwhile, a platform 110, a step 120, etc., may be installed around the recovery furnace 200 to allow operators to pass therethrough in order to perform maintenance of the peripheral devices.

The recovery furnace 200 in accordance with an exemplary embodiment of the present invention is constituted by walls of a front, a rear, sides, a ceiling and a floor. In order to block radiation of heat in an inner space exposed to a relatively higher temperature than an outer space to the exterior, each wall is formed of a multi-wall including an insulating layer. Each wall of the recovery furnace 200 may include an intermediate insulating layer formed of firebricks, yellow earth, etc., and inner and outer layers constituting the interior and exterior of the insulating layer. The inner and outer layers are formed of iron plates having a predetermined thickness. In particular, considering that the heating chamber 220 and the pyrolysis chamber 230 of the recovery furnace 200 are exposed to a large amount of heat, the inner and outer layers may be formed of forged steel (SB42) for pressure vessels.

The heat plate 210 for dividing the inner space of the recovery furnace 200 into the heating chamber 220 and the pyrolysis chamber 230 is formed of an iron plate installed at an inner intermediate portion of the recovery furnace 200 and having a predetermined thickness. As shown, the heat plate 210 has a bent structure in which the heat plate 210 has a height reduced from a center part to both sides thereof and at least one ridge and valley in a longitudinal direction thereof. In particular, the heat plate 210 in accordance with an exemplary embodiment of the present invention has a bent structure in which two valleys are formed at front and rear portions thereof with the intermediate part interposed therebetween. The primary residual conveyance screw 510 of the residual discharge means 500 is installed along the valley, which will be described below with regard to the valley of the heat plate 210.

In addition, burners 240 are installed at both side surfaces of the recovery furnace 200 to maintain the interior of the heating chamber 220 at a high temperature so that heat generated from the burners 240 is introduced into the heating chamber 220. Meanwhile, as shown in FIG. 3, when the heating chamber 220 is divided into two portions by the residual hopper 520 as a component of the residual discharge means 500, the burners 240 installed at both side surfaces supply heat into the heating chamber 220 and the heating pipe line 300 corresponding thereto.

In this embodiment of the present invention, in order to supply the heat in the heating chamber 220 toward the heating pipe line 300, a heat induction pipe 222 is installed between a start section of the heating pipe line 300 and the heating chamber 200, and a blower 224 is installed at a front end of the heating pipe line 300 to strongly introduce the heat induced by the heat induction pipe 222 toward the heating pipe line 300.

In the pyrolytic energy recovery system 100 in accordance with an exemplary embodiment of the present invention, recyclable material inlet ports 250 are installed at both upper sides of the recovery furnace 200 to introduce recyclable materials such as wastes into the pyrolysis chamber 230. Compression cylinders 252 and pistons 254 are installed outside the recyclable material inlet port 150 to insert the recyclable materials such as wastes in a compressed state through a predetermined process. In addition, recyclable material hoppers 256 are installed on the compression cylinders 252 to smoothly introduce the recyclable materials conveyed through lift means such as hoists 130, etc., into the compression cylinders 252. As shown, the recyclable material inlet ports 250 are installed at both sides of the front and rear walls of the recovery furnace 200.

As described above, in order to more effectively decompose the recyclable materials introduced through the recyclable inlet ports 250 installed at both upper sides of the recovery furnace 200, the heating pipe line 300 is installed to induce some heat of the heating chamber 220 toward the front and rear wall surfaces. The heating pipe line 300 is configured such that a large amount of heat induced from the heating chamber 220 flows along front and rear inner wall surfaces of the recovery furnace 200 from a lower side to an upper side thereof in a zigzag manner to be returned into the heating chamber 220 at a pressure lower than a predetermined pressure and discharged to the exterior at a pressure higher than the predetermined pressure. That is, the heating pipe line 300 has a maze structure adjacent to the entire front and rear wall surfaces of the recovery furnace 200 such that the heat generally flows from the lower side to the upper side, flows from a left side to a right side at a certain height, and then, flows from the right side to the left side at another certain height.

In the pyrolytic energy recovery system 100 in accordance with an exemplary embodiment of the present invention, the heating pipe line 300 is installed inside the front and rear walls of the recovery furnace 200. The heating pipe line 300 has a zigzag upward section 310 in which heat starts at both sides of the recovery furnace 200 and flows from a lower side to an upper side, and then, returns downward at a center portion of the recovery furnace 200 to the heating chamber 220, and a downward section 320 disposed in a vertical direction. In addition, an exhaust port 330 is installed at a boundary between the upward section 310 and the downward section 320 and directed to an upper part of the exterior of the recovery furnace 200 to discharge the heat. Meanwhile, a pressure regulator 340 is installed on the exhaust port 330 of the heating pipe line 300 to open/close the exhaust port 330 at a certain pressure, controlling a path of the heat passing through the upward section 310 of the heating pipe line 300.

In the pyrolytic energy recovery system in accordance with an exemplary embodiment of the present invention, as components of the rotary means 400 for crushing and evenly distributing the recyclable materials introduced into the pyrolysis chamber 230 through the recyclable material inlet port 250, a plurality of rotaries 410 are installed to longitudinally cross the interior of the pyrolysis chamber 230 under the recyclable material inlet ports 250. The rotaries 410 are disposed under the recyclable material inlet ports 250 installed at both sides of the recovery furnace 200 in a vertical direction at predetermined intervals to form a multi-story structure, each story having a plurality of rotaries horizontally disposed therein. In particular, the number of the rotaries 410 disposed on the intermediate story is larger than that of the rotaries 410 disposed on the upper story by one so that the rotaries of the upper story are disposed between the rotaries of the intermediate story, thereby improving efficiency in fine crush and even distribution of the recyclable materials. The rotaries 410 may be rotated by separate drive sources, or may be rotated by a single drive source by connecting sprockets 420 installed at one ends of the rotaries 410 using a chain, etc.

In addition, in the pyrolytic energy recovery system 100 in accordance with an exemplary embodiment of the present invention, residual rotaries 430 may be installed at longitudinal center portions of pairs of primary residual conveyance screws 510 installed at both sides of the recovery furnace 200, respectively. Blades 432 having a radius close to the valley of the heat plate 210 are installed on a shaft of the residual rotary 430 to stir residuals accumulated on the valley of the heat plate 210 and smoothly discharge the residuals through the primary residual conveyance screw 510.

The residual discharge means 500 in accordance with an exemplary embodiment of the present invention includes the primary residual conveyance screws 510 longitudinally installed along the valley of the heat plate 210 to be rotated to convey residuals accumulated on the heat plate 210 from both sides to a center portion of the recovery furnace 200, the residual hopper 520 installed in a separate space of the heating chamber 220 such that the residuals conveyed to the center portion of the heat plate 210 through the primary residual conveyance screws 510 are lowered and gathered, a secondary residual conveyance screw 530 installed from the residual hopper 520 to the outer surface of the recovery furnace 200 to discharge the residuals accumulated on the residual hopper 520 to the exterior of the recovery furnace 200, and a residual storage chamber 540 for storing the residual discharged to the exterior of the recovery furnace 200 through the secondary residual conveyance screw 530.

In particular, the primary residual conveyance screws 510, components of the residual discharge means 500 of the present invention, may be configured to raise the residuals accumulated on both sides of the heat plate 210, relatively lower than the center portion, and then discharge the residuals through the residual hopper 520, thereby making it possible to reduce the heat in the pyrolysis chamber 230 from being discharged to the exterior and reduce the phenomenon of the imperfectly pyrolyzed recyclable materials or residuals being discharged to the exterior. The residual hopper 520 in accordance with an exemplary embodiment of the present invention divides the heating chamber 220 into two portions such that they are isolated from each other.

In the pyrolytic energy recovery system 100 in accordance with an exemplary embodiment of the present invention, a rotational direction of the primary residual conveyance screws 510 of the residual discharge means 500 is set to move the residuals upward, and the recyclable material inlet ports 250 through which the recyclable materials are introduced are installed at both sides of the recovery furnace 200, thereby reducing the phenomenon of the imperfectly pyrolyzed recyclable materials or residuals being discharged through the primary residual conveyance screw 510.

In addition, condensers 610, as components of the condensing means 600 for receiving vaporized extracts generated during a process of exposing recyclable materials such as wastes to a large amount of heat and pyrolyzing the wastes in the pyrolysis chamber 230 to heat-exchange with the extracts and extracting recovery oil, are installed at front and rear surfaces of the recovery furnace 200. Vapor discharge pipes 260 are disposed on the pyrolysis chamber 230 to supply the vaporized extracts generated in the pyrolysis chamber 230 toward the condensers 610. Meanwhile, vapor induction pipes 262 are disposed at upper ends of the vapor discharge pipes 260 and connected to upper parts of the condensers 610 to separately supply the vaporized extracts toward the condensers 610.

Meanwhile, the condensers 610 in accordance with an exemplary embodiment of the present invention may be installed at both sides of front and rear surfaces of the recovery furnace 200 depending on a volume thereof in a plurality of pairs. In addition, heat exchangers 620 are installed around the condensers 610 to exchange heat with cooling water, respectively. As shown, the heat exchangers 620 may be disposed around the condensers 610 in a multi-story structure, and the heat exchangers 620 installed at each story may be disposed to move the cooling water from a lower side to an upper side thereof. The condenser 610 has a funnel shape with a large upper portion and a small lower portion, and a recovery oil discharge port 612 is disposed around a lower end of the condenser to discharge recovery oil in a liquid state.

In particular, in the pyrolytic energy recovery system 100 in accordance with an exemplary embodiment of the present invention, since a residual discharge process in the pyrolysis chamber 230 is different from that of the conventional apparatus, it is possible to remarkably reduce heat loss of the pyrolysis chamber 230 and more effectively reduce the phenomenon of the imperfectly pyrolyzed recyclable materials or residuals being discharged to the exterior.

In addition, in the pyrolytic energy recovery system 100 in accordance with an exemplary embodiment of the present invention, the heating pipe lines 300 installed around the wall of the recovery furnace 200 have a maze structure including a zigzag upward section and a vertical downward section installed along the entire surface of the wall to more effectively transfer heat to the pyrolysis chamber 230.

Further, when a pressure of the heat transfer medium provided from the heating chamber 220 to the heating pipe line 300 is lower than a predetermined level, the heat is recirculated into the heating chamber 220, and when the pressure is higher than the predetermined level, the heat is discharged to the exterior, thereby reducing waste of energy consumed for driving of the burner 240.

While this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

The invention claimed is:

1. A pyrolytic energy recovery system for pyrolyzing wastes to obtain oil, the system comprising:
    a recovery furnace formed of multi-walls of a front, a rear, sides, a ceiling and a floor including insulating layers;
    a heat plate for dividing an inner space of the recovery furnace into upper and lower parts and having a height lowered from a center part to both sides thereof and formed with at least one ridge and valley in a longitudinal direction thereof;
    a heating chamber disposed under the heat plate and heated by a burner installed aside the recovery furnace;
    a pyrolysis chamber disposed over the heat plate and pyrolyzing the wastes introduced through a recyclable material inlet port installed at an upper part of a front or rear surface of the recovery furnace using a large amount of heat transferred from therearound;
    a heating pipe line installed inside the front and rear surfaces of the recovery furnace in a maze shape such that the heat induced from the heating chamber flows from a lower side to an upper side along inner surfaces of front and rear walls of the recovery furnace in a zigzag manner, and then, returns into the heating chamber at a pressure lower than a predetermined pressure and is discharged to the exterior at a pressure higher than the predetermined pressure;
    a plurality of rotaries installed in the pyrolysis chamber under the recyclable material inlet port in a longitudinal direction to evenly distribute recyclable materials introduced through the recyclable material inlet port;
    a residual discharger having primary residual conveyance screws longitudinally installed along the valley of the heat plate and rotated to convey the residual toward the center part from both sides, a residual hopper installed at a separate space in the heating chamber such that the residual conveyed to a center part of the heat plate through the primary conveyance screws is lowered to be gathered, and a secondary residual conveyance screw installed from the residual hopper to the exterior of the recovery furnace and discharging the residual accumulated in the residual hopper to the exterior of the recovery furnace; and
    a condenser separately installed at the exterior of the recovery furnace and receiving vaporized extracts generated through pyrolysis of the recyclable material in the pyrolysis chamber to exchange heat with the extracts to extract liquefied recovery oil.

2. The pyrolytic energy recovery system according to claim 1, wherein the heating pipe line installed at front and rear surfaces of the recovery furnace comprises: a blower connected to the heating chamber through a heat induction pipe installed at both outer surfaces of the recovery furnace at its ends and installed at an end of the heating pipe line such that the heat introduced through the heat induction pipe flows toward the heating pipe line, wherein the heating pipe line has an upward section having a zigzag shape such that the introduced heat flows from a lower side to an upper side in an alternating direction and a vertical section formed from an end of the upward section to the heating chamber in a vertical direction to be in communication with the upward section, an exhaust port is installed at a boundary between the upward section and a downward section to discharge the heat to be directed to the upper exterior of the recovery furnace, and a pressure regulator is installed on the exhaust port to be opened and closed by a certain pressure.

3. The pyrolytic energy recovery system according to claim 1, wherein the plurality of rotaries are installed under the recyclable material inlet ports installed at both sides of the recovery furnace to form a multi-story structure in a vertical direction at predetermined intervals, and each story has a plurality of rotaries, wherein the number of rotaries disposed in the intermediate story is larger than that of the rotaries disposed in the upper story by one, and the rotaries of the upper story are disposed between the rotaries of the intermediate story.

4. The pyrolytic energy recovery system according to claim 1, wherein the primary residual conveyance screw further comprises a rotary installed on an intermediate portion thereof to cross between the front and rear walls of the recovery furnace, wherein the rotary comprises a blade having a diameter such that ends of the blade are close to the surface of the valley of the heat plate and stirring the residual accumulated on the valley of the heat plate to smoothly discharge the residual through the primary residual conveyance screw.

5. The pyrolytic energy recovery system according to claim 1, wherein the residual hopper is installed to divide the heating chamber into two side portions.

* * * * *